Figure 1:
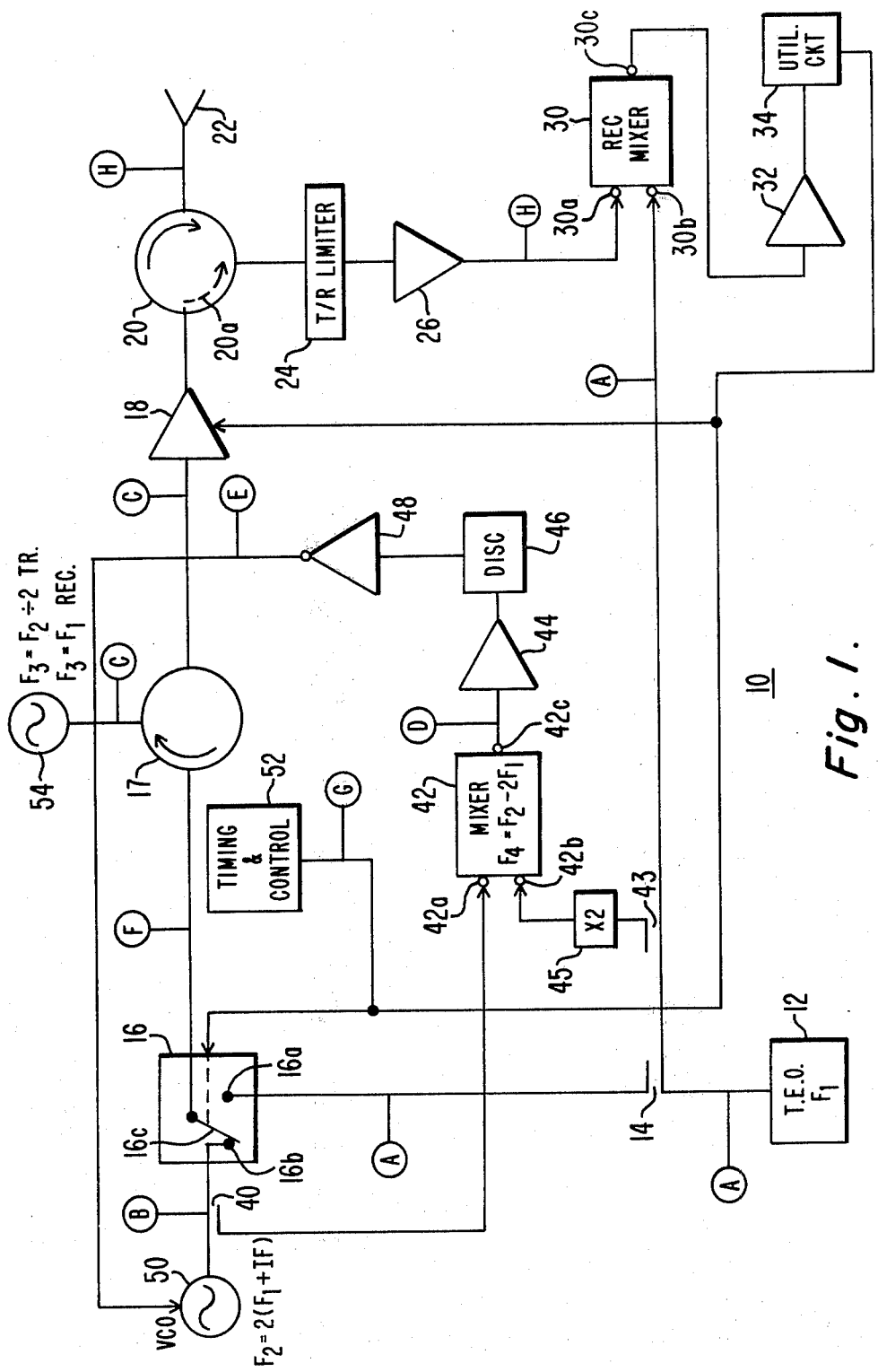

United States Patent [19]

Mawhinney

[11] 4,238,796
[45] Dec. 9, 1980

[54] RADIO FREQUENCY PULSE GENERATOR
[75] Inventor: Daniel D. Mawhinney, Livingston, N.J.
[73] Assignee: RCA Corporation, New York, N.Y.
[21] Appl. No.: 52,782
[22] Filed: Jun. 28, 1979
[51] Int. Cl.³ .............................. G01S 7/28; H03L 7/00
[52] U.S. Cl. .................................... 343/17.1 R; 331/2; 331/173
[58] Field of Search ................. 331/2, 172, 173, 179; 343/17.1 R

[56] References Cited
U.S. PATENT DOCUMENTS
4,131,861  12/1978  Malaviya ................................ 331/2

Primary Examiner—T. H. Tubbesing
Attorney, Agent, or Firm—Samuel Cohen; Robert L. Troike; Raymond E. Smiley

[57] ABSTRACT

A radio frequency pulse generator for use in a pulsed radar transmitter includes a reference oscillator of one radio frequency, a second oscillator producing a different second radio frequency which differs from a multiple M of the first frequency by a given amount and a third oscillator which is injection locked by the second oscillator to produce a subharmonic frequency of the second frequency and, when not transmitting, is injection locked by the first oscillator to thereby produce its frequency.

9 Claims, 2 Drawing Figures

RADIO FREQUENCY PULSE GENERATOR

This invention relates to a radio frequency (RF) pulse generator and more particularly to an rf generator for use in radar systems.

In the prior art, an RF pulse generator has utilized a magnetron as the RF power generator. The magnetron responds to each of a succession of high voltage bias pulses by generating a high power signal at some preselected radio frequency and ideally either generates that frequency without changes in frequency as the magnetron is pulsed on or, when no bias pulse is present as during the receive mode in a pulse radar system, produces no frequency. Magnetrons come close to the ideal. They are, however, bulky, heavy and costly when compared to modern solid state technology. Further, the magnetron frequency is utilized in conjunction with the frequency of another oscillator to produce an intermediate frequency (IF) which for weather radar has been on the order of 30 MHz. It is now desired to have a much lower intermediate frequency of about one-tenth that utilized in the prior art and therefore utilize smaller tolerances than heretofore considered normal.

It is therefore desirable to use a solid-state RF pulse generator. Such a generator, like the magnetron, ideally produces only the desired radio frequency when pulsed and no frequency or at least not the preselected frequency when turned "off" during the receive mode. Such solid-state type generators undesirably exhibit wide frequency excursions upon turn-on. However, if the generator remains on continuously, signals produced by the generator tend to mask very weak radar return signals during the receive mode in a radar system utilizing the solid-state generator thus reducing substantially the sensitivity of the system.

In one prior art solid-state generator circuit, as disclosed in U.S. patent application Ser. No. 044,177, filed May 31, 1979 by H. C. Johnson, a reference oscillator produces a frequency $F_1$. A second varactor controlled oscillator (VCO) comprised of an oscillator diode and a varactor diode normally in response to an applied control voltage produces a different frequency $F_2$ which is the transmitted frequency. When transmission is not occuring, the second oscillator is injection locked by the reference oscillator operating at frequency $F_1$ to thereby produce frequency $F_1$.

It has been found that after the injection locking signal is removed from the VCO and its frequency is therefore controlled by the control voltage it does not instantaneously revert to the unlocked frequency $F_2$, but rather there is a continuous slight change in frequency which is primarily caused by the very small change in thermal equilibrium in the oscillator diode and the varactor diode when the injection locking signal power (also very small) is removed. This change in thermal equilibrium essentially changes the loading on the transmitting oscillator and the dissipation of both diodes causing them to undergo a thermal transient producing a small—but significant—frequency shift during the time the transmitting pulse is present. This shift may exceed the bandwidth of the narrow band IF.

In accordance with the present invention, a reference oscillator produces frequency $F_1$. A second oscillator produces a different frequency $F_2$ which differs from a multiple M of $F_1$ by a preselected amount. A third oscillator is injection locked by the reference oscillator to its frequency $F_1$ during receive mode and injection locked by the second oscillator to $1 \div M$ the frequency $F_2$ of the second oscillator during the transmit mode.

Figure 2:
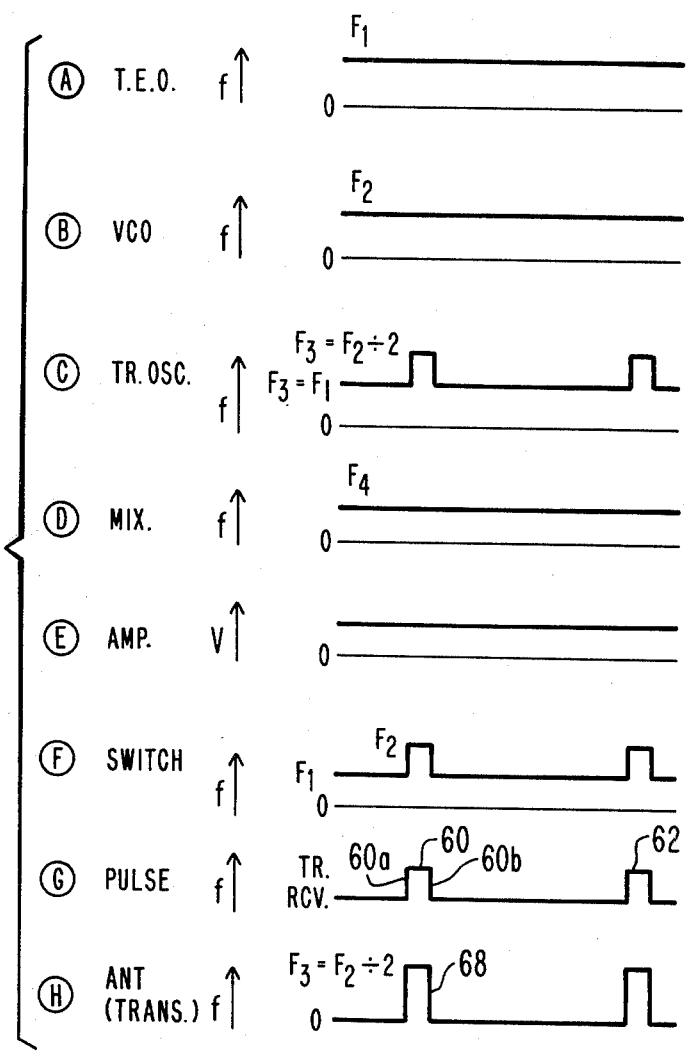

FIG. 1 is a preferred embodiment of the transmitting and receiving portion of a pulsed radar system in block diagram form in accordance with the present invention including the RF pulse generator of the pulsed radar system; and FIG. 2 is a set of waveforms useful in understanding the operation of the FIG. 1 circuit.

Referring to FIG. 1 the encircled letters at various points in the figure correspond to similarly legended waveforms in FIG. 2. FIG. 1 is a block diagram of a pulse radar transmitter and receiver 10 such as utilized for airborne weather radar systems. A reference oscillator 12 such as a transferred electron oscillator produces a nominal frequency $E_1$ such as, for example, 9342 MHz. The oscillator which produces an actual frequency $F_1$ is subject to slight variations in frequency from the nominal which are compensated by the system as will be described hereinafter.

Oscillator 12 is coupled to terminal 30b of a frequency subtractive mixer or a low pass mixer 30. Mixer 30 is typically an image reject or double balanced mixer. A coupler 14 couples frequency $F_1$ to terminal 16a of an electronic single-pole, double-throw switch 16. Arm 16c of switch 16 is coupled to circulator 17. Circulator 17 is coupled to a radio frequency power amplifier 18. Amplifier 18 is coupled to a circulator 20 sometimes referred to as a duplexer. Circulator 20 is coupled to a transmit and receive antenna 22 of conventional design for transmitting RF pulses into the atmosphere and receiving reflected return signals therefrom.

RF signals returned to antenna 22 are passed by circulator 20 to a transmit/receive limiter 24 coupled to circulator 20. Limiter 24 is coupled to an RF amplifier 26. The purpose of limiter 24 is to clip high powered signals appearing at terminal 18 passing in the direction of arrow 20a to limiter 24 to prevent damage to amplifier 26.

Amplifier 26 is coupled to an input terminal 30a of mixer 30. Mixer 30 produces at terminal 30c signals which are the difference in frequency between those applied to the mixer at terminal 30a and terminal 30b. That is, mixer 30 produces signals which are termed intermediate frequencies (IF). Terminal 30c is coupled to an intermediate frequency amplifier 32 which is in turn coupled to utilization circuit 34. Circuit 34 may be, for example, a weather radar circuit for detecting and displaying storm intensities corresponding to signals received at antenna 22 from various points in the atmosphere.

A second oscillator such as a voltage controlled oscillator (VCO) 50 is coupled to terminal 16b of switch 16. VCO 50 is designed to operate at a frequency which is a multiple M of the sum of $F_1$ and the intermediate frequency (IF) at which the system is designed to operate, e.g., an IF of 3 MHz from mixer 30. For example, with an IF of 3 MHz and $F_1$ of 9342 MHz and $M = 2$, $F_2 = M(F_1 + IF) = 2(9342 + 3) = 18,690$ MHz which is the nominal frequency $f_2$ of VCO 50. If the actual frequency $F_1$ of oscillator 12 differs from the nominal frequency thereof, the actual frequency $F_2$ of VCO 50 will be caused to differ from $F_2$ in accordance with the above formula for $F_2$.

A coupler 40 couples a portion of the signals from VCO 50 to one input terminal 42a of mixer 42 which may be a single diode mixer. A coupler 43 couples a portion of the signals from oscillator 12 to a frequency doubler 45 the output of which is coupled to another input terminal 42b of mixer 42. Mixer 42 produces at its output terminal 42c a frequency $F_4$ which is the difference of the frequencies, $F_2$ and $2F_1$ applied to terminals 42a and 42b respectively. In the above cited example $F_4$ equals 6 MHz. The difference or IF signal appearing at terminal 42c, which typically differs from that produced by mixer 30 by the factor M, is amplified by amplifier 44 and passed to a frequency-to-voltage discriminator 46. Discriminator 46 produces a voltage which is a function of the frequency produced by mixer 42. Discriminator 46 is coupled to an inverter 48. Inverter 48 is coupled to the control terminal of oscillator 50. Inverter 48 is of the type which produces for a relatively higher input voltage a relatively lower output voltage and produces for a relatively lower input voltage a relatively higher output voltage.

Discriminator 46 and inverter 48 may be commercially available products designed to produce system equilibrium with mixer 42 producing a given frequency such as M times the system intermediate frequency ($M \times IF$) at which mixer 30 operates such as, for example, 6 MHz. A discriminator particularly suited to perform the function of discriminator 46 and inverter 48 is described in U.S. patent application Ser. No. 044,087, filed May 31, 1979 by H. C. Johnson, et al.

Oscillator 50 is typically a voltage controlled oscillator (VCO) which responds to the voltage signals received from inverter 48 to produce a corresponding output frequency which is applied to switch terminal 16b of switch 16. Oscillator 50 produces an increasing frequency for increasing control voltage applied thereto and produces a decreasing frequency for a decreasing voltage applied thereto.

The position of switch arm 16c is determined by a timing and control circuit (T/C) 52 which is also coupled to amplifier 18 and to utilization circuit 34 to control the response to signals from amplifier 32. T/C 52, which may be a crystal oscillator having a fixed frequency digitally stepped down to desired values in conventional manner, produces a series of signals of one value (which may be termed pulses) alternating with signals at another value. For example, it may produce 288 pulses per second, each pulse being of pulse width or pulse time duration of 10 microseconds. Switch arm 16c is responsive to the presence of pulses from circuit 52 to be positioned to terminal 16b to thus place the system 10 in the transmit mode and is responsive to the absence of such pulses to be positioned to terminal 16a to thus place system 10 in the receive mode.

A third oscillator 54 is coupled to circulator 17. Oscillator 54 which may be a transferred electron oscillator similar to oscillator 12 is designed to operate at a frequency $F_3 \approx F_1$ or, for example, at approximately 9342 MHz$\pm$30 MHz. Therefore, during the transmit mode of system 10 when switch arm 16c is positioned to terminal 16b, oscillator 54 is injection locked by oscillator 50. Since $F_2$ appears at circulator 17, and since oscillator 54 is capable of oscillation at only approximately $F_2 \div 2$ (assuming $M=2$) oscillator 54 will operate at a frequency which is a submultiple (subharmonic) of $F_2$ and thus produces frequency $F_3 = F_2 \div 2$ of, for example, 9345 MHz. Subharmonic injection locking is discussed in Manassewitsch "Frequency Synthesizers Theory and Design" (New York; John Wiley & Sons, 1976), pp. 353–354.

Frequency $F_3$ is amplified by amplifier 18 and coupled via circulator 20 as a transmit signal to antenna 22.

During the receive mode of system 10 when switch arm 16c is positioned to terminal 16a, oscillator 54 is injection locked by oscillator 12 to its frequency since oscillator 12 has a frequency within the frequency range at which oscillator 54 can operate. Therefore during the receive mode oscillator 54 produces frequency $F_3$ equal to $F_1$ and the only signals at frequency $F_2 \div 2$ in the system are those reflected back to antenna 22 from the atmosphere.

Amplifier 18 amplifies RF signals appearing thereat from oscillator 54 to power levels required at antenna 22. Amplifier 18 may consist of a plurality of RF power amplifiers of the type described in U.S. patent application Ser. No. 044,390, filed June 1, 1979 by J. O. Schroeder. Amplifier 18 amplifies and couples the signals to circulator 20 only when pulses are being received from T/C 52, that is only during the transmit mode. During the receive mode when oscillator 54 is producing $F_3$ equal to $F_1$, amplifier 18 is cut off and no signal is transmitted from antenna 22.

The operation of the circuit of FIG. 1 will now be given with the aid of the waveforms illustrated in FIG. 2. None of the waveforms illustrated in FIG. 2 are drawn to scale either as to ordinate or abscissa. The waveforms of FIG. 2 are intended to be used only as an aid in understanding the operation of the circuit of FIG. 1.

The circuit of FIG. 1, as mentioned previously, is either in the transmit mode or the receive mode. It will be initially assumed to be in the transmit mode. Oscillator 12 is initially assumed to produce a radio frequency signal of a given value such as 9342 MHz. Further, it will be assumed that oscillator 50 produces a frequency $F_2$ of 18,690 MHz. Therefore, 10 microsecond pulse 60, FIG. 2, waveform G (hereinafter waveform G-60) causes arm 16c of switch 16 to be positioned to terminal 16b and causes amplifier 18 to amplify radio frequency signals produced thereat. Therefore oscillator 54, injection locked to oscillator 50, produces $F_3 = 9345$ MHz. Antenna 22 transmits into the atmosphere a 10 microsecond pulse of $F_3 = 9345$ MHz as illustrated in waveform H-68.

During the time waveform G-60 is present, and therefore an RF signal is applied at amplifier 18, the RF signal is leaked in the reverse direction around circulator 20 as indicated by dashed arrow 20a due to leakage known to occur in circulators. The leaked signal is passed through limiter 24, amplified by amplifier 26 and applied to terminal 30a of mixer 30. Mixer 30 also simultaneously receives a signal from oscillator 12 at terminal 30b. Mixer 30 therefore produces an IF signal at terminal 30c. Since utilization circuit 34 is disabled by waveform G-60, no action is taken upon the IF signal at this time. At the trailing edge 60b of waveform G-60 which marks the change-over from transmit mode to receive mode, three events occur: (1) switch arm 16c is positioned to terminal 16a, (2) amplifier 18 is disabled, and (3) circuit 34 is made active.

When switch arm 16c is connected to terminal 16a oscillator 54 is connected to oscillator 12 via circulator 17. When the two oscillators are connected together, oscillator 54 becomes injection locked by oscillator 12 such that oscillator 54 produces the same frequency 9342 MHz, for example, as oscillator 12 and not the transmitting frequency of 9345 MHz. Oscillartor 12 is not injection locked by oscillator 54 since oscillator 12 is isolated from oscillator 54 by circulator 17. The shift in frequency from 9345 MHz to 9342 MHz occurs in approximately one RF cycle. That is, approximately one cycle after arm 16c is positioned to terminal 16a. No transmitting frequency signal is present in the circuit of FIG. 1 except the signal returned to antenna 22 from the atmosphere.

The received return signals of 9345 MHz at antenna 22 are routed by circulator 20 through limiter 24 and amplifier 26 to terminal 30a of mixer 30. Mixer 30 is also receptive at terminal 30b of a 9342 MHz signal from reference oscillator 12. Mixer 30 thus produces a 3 MHz IF signal which is processed by utilization circuit 34.

Regardless of whether system 10 is in the receive mode or the transmit mode, mixer 42 is continuously receptive of frequencies $F_2$ and $M \cdot F_1$. Radio frequency signals of frequency $F_2$ from VCO 50 are applied at terminal 42a. Radio frequency signals of $F_1$ from oscillator 12 multiplied by some multiple M such as 2 are applied at terminal 42b. Mixer 42 thus continuously produces at its output terminal 42c a frequency $F_3 = F_2 - 2F_1$ of, for example, 6 MHz, which is converted by discriminator 46 and inverter 48 to control signal to maintain VCO 50 at a desired frequency. It will thus be noted that particularly in the receive mode the only 3 MHz signal present is that from mixer 30. No 3 MHz signal is produced by mixer 42. Such a signal is undesirable in that, if coupled to mixer 30 and the circuits therefollowing, would be treated as undesirable noise.

Upon generation of the next pulse 62 (waveform G-62) by T/C 52, switch arm 16c is reconnected to terminal 16b disconnecting oscillator 54 from oscillator 12 and causing oscillator 54 to be injection locked by oscillator 50 which is stable at a frequency of $F_2$. Therefore, oscillator 54 is caused to become stable producing a frequency $F_3 = F_2 \div 2$ of 9345 MHz within one RF cycle after oscillator 50 is connected thereto.

If for some reason oscillator 12 goes down in frequency, mixer 42 will produce a signal of greater frequency than 6 MHz, the voltage in discriminator 46 will rise accordingly and the voltage from inverter 48 will decrease accordingly causing the frequency of VCO 50 to decrease. Conversely, if the frequency of oscillator 12 increases for some reason, the frequency of mixer 42 will decrease and the voltage from inverter 48 will increase causing an increase in the voltage applied to oscillator 50 at an increase in its output frequency, thus maintaining a 6 MHz differential between oscillator 12 and oscillator 50.

I claim:

1. A radio frequency pulse generator comprising in combination:

a first means producing a first radio frequency signal at frequency $F_1$;

a second means producing a second radio frequency signal at a second different frequency $F_2$ which differs from a multiple M of $F_1$ by a given amount, where M is an integer;

a third means producing radio frequency signal $F_3$;

means producing a control signal periodically alternating between a first value and a second value;

means responsive to said control signal of said second value for causing said third means to be injection locked by said second means to thereby produce frequency $F_3 = F_2 \div M$ and responsive to said control signal at said first value for causing said third means to be injection locked by said first means to thereby produce frequency $F_3 = F_1$; and means responsive to said third means when producing said frequency $F_3 = F_2 \div M$ for providing said frequency $F_3$.

2. The combination as set forth in claim 1 further including a subtractive mixer responsive to a multiple M of said frequency $F_1$ from said first means and responsive to said frequency $F_2$ from said second means for producing a difference frequency, thereof, said difference frequency being an intermediate frequency.

3. The combination as set forth in claim 2 wherein said second means is a voltage controlled oscillator.

4. The combination as set forth in claim 3 further including means responsive to said intermediate frequency for producing a control voltage which is a function of said intermediate frequency, said control voltage being applied to said voltage controlled oscillator to control the frequency thereof.

5. The combination of claim 1 wherein said first means is a transferred electron oscillator.

6. The combination of claim 1 wherein said means for providing said frequency $F_3$ comprises a radio frequency signal amplifier coupled to said third means for amplifying signals therefrom and a transmitting antenna for transmitting said amplified signals into the atmosphere.

7. The combination as set forth in claim 6 wherein said means responsive to said control signal is a switch means.

8. The combination as set forth in claim 1, wherein said switch means includes means responsive to said control signal for coupling said third means to said first means only when said control signal of said first value is present and coupling said third means to said second means only when said control signal of said second value is present.

9. The combinaton as set forth in claim 6 wherein said transmitting antenna is also a receiving antenna for receiving reflected signals of said frequency $F_3 = F_2 \div M$ and further including a mixer receptive of said received signals of frequency $F_3 = F_2 \div M$ and receptive of signal of frequency $F_1$ for producing a signal of frequency which is the difference of $F_1$ and $F_3$.

* * * * *